Nov. 28, 1967

A. PAREDES 3,354,746

HYDROKINETIC TORQUE CONVERTER WITH OVERDRIVE GEARING

Filed June 9, 1965

INVENTOR:
ANDREW PAREDES
BY
ATTORNEYS.

Fig. 2

| TORQUE CONVERTER | CLUTCH A | CLUTCH B | CLUTCH C | CAVITY E | TORQUE RATIO * | SPEED RATIO @ |
|---|---|---|---|---|---|---|
| (a) DRIVE | OFF | LOCKED | OVER-RUNNING | PRESSURE | CONVERTER CONV. S.R. | CONVERTER CONV. S.R. |
| (b) COAST | OFF | OVER-RUNNING | LOCKED | PRESSURE | $\frac{R}{R+S}$ | $\frac{R+S}{R}$ |
| MECHANICAL OVERDRIVE (a) DRIVE | ON | OVER-RUNNING | OVER-RUNNING | EXHAUST | $\frac{R}{R+S}$ | $\frac{R}{R}$ |
| (b) COAST | ON | OVER-RUNNING | LOCKED | EXHAUST | $\frac{R}{R+S}$ | $\frac{R+S}{R}$ |

\* TORQUE RATIO = $\dfrac{\text{TORQUE ON RING GEAR}}{\text{ENGINE TORQUE}}$

@ SPEED RATIO = $\dfrac{\text{RING GEAR SPEED}}{\text{ENGINE SPEED}}$

INVENTOR:
ANDREW PAREDES
BY
ATTORNEYS.

United States Patent Office 3,354,746
Patented Nov. 28, 1967

3,354,746
HYDROKINETIC TORQUE CONVERTER WITH OVERDRIVE GEARING
Andrew Paredes, Wayne, Mich., assignor to Ford Motor Company, Dearborn, Mich., a corporation of Delaware
Filed June 9, 1965, Ser. No. 462,595
8 Claims. (Cl. 74—688)

ABSTRACT OF THE DISCLOSURE

This specification discloses a hydrokinetic torque converter with overdrive gearing located within the converter impeller housing. A mechanical, overdrive torque delivery path is established and disestablished by engaging and disengaging a single friction coupling. A hydrokinetic torque delivery path is established when the overdrive gearing is inactive as the turbine of the converter is connected through an overrunning coupling to the driven member.

General description of the invention

My invention relates generally to improvements in hydrokinetic power transmission mechanisms, and more particularly to an improved hydrokinetic torque converter having overdrive planetary gearing capable of establishing a geared torque delivery path from the impeller of the converter to a converter turbine driven shaft.

A preferred form of my invention includes a three element hydrokinetic torque converter capable of multiplying torque hydrokinetically in a torque delivery driveline of a wheeled vehicle as the vehicle is accelerated. During cruising operation of the vehicle, however, the mechanism of my invention is capable of establishing a direct mechanical torque delivery path between the driving member and the turbine shaft thus bypassing the hydrokinetic portions of the mechanism.

The provision of a torque converter of the type above set forth being a principal object of my invention, it is a further object of my invention to provide a hydrokinetic torque converter having a planetary gear system that establishes a geared, overdrive ratio between the driving member and the driven turbine shaft during cruising operation as the hydrokinetic torque delivery path is rendered ineffective.

It is a further object of my invention to provide a mechanism of the type set forth in the preceding object wherein the gear system is rendered ineffective when the torque converter is operated at a speed ratio less than unity, but which is rendered effective to establish a mechanical torque delivery path from the driving member to the turbine driven shaft during cruising operation as the hydrokinetic unit becomes ineffective.

It is a further object of my invention to provide a torque converter having a gearing system of the type above set forth wherein separate elements of the gearing system are connected through torque transmitting clutch structures to separate bladed members of the hydrokinetic unit.

It is a further object of my invention to provide a torque converter of the type above set forth wherein provision is made for establishing a torque delivery path from the turbine driven shaft to an engine driven shaft during coast braking operation. I contemplate, however, that this latter torque delivery path will be rendered ineffective during torque delivery from the engine to the turbine driven shaft.

Description of the figures of the drawings

FIGURE 2 shows a chart which summarizes the mode of operation of the structure of FIGURE 1.

Particular description of the invention

Figure 1:
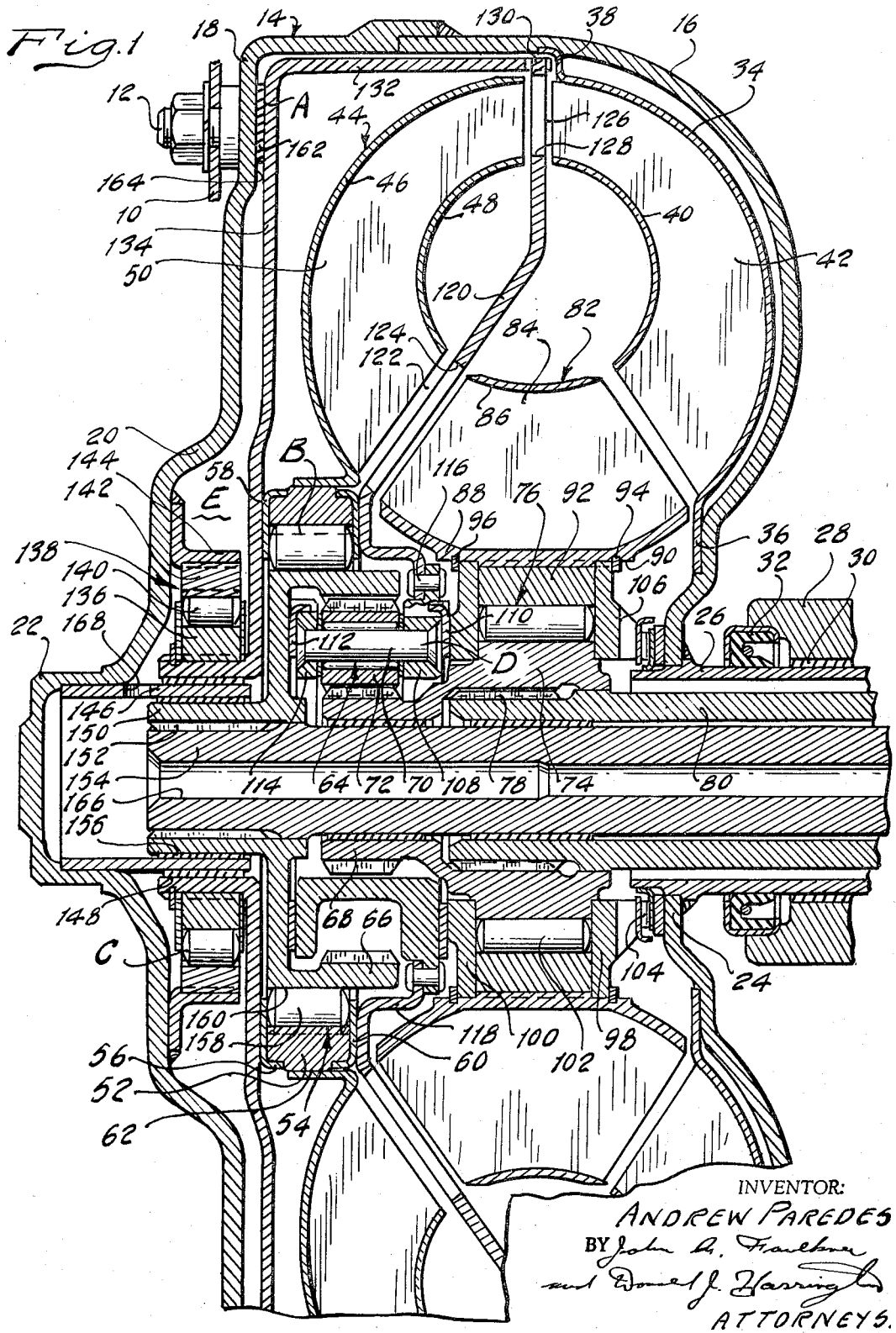
FIGURE 1 shows in longitudinal cross sectional form the principal elements of my improved converter construction.

In FIGURE 1 numeral 10 designates the drive plate for a power transmission system. The drive plate can be connected to the crankshaft of an internal combustion vehicle engine. It is connected at its outer periphery by means of bolts 12 to an impeller shell designated generally by reference character 14. Shell 14 comprises a portion 16, which is in the shape of a semi-torus, and a clutch portion 18 comprising a radially extending wall 20. A pilot projection 22 on wall 20 can be piloted within a recess formed in the end of the crankshaft, not shown.

Shell portion 16 comprises a hub 24 which is welded or otherwise secured to a mounting sleeve shaft 26. The sleeve shaft is received within an opening formed in the supporting boss 28. A suitable bushing 30 journals the sleeve shaft 26 in the boss 28. A fluid seal 32 is in sealing engagement with the outer periphery of the shaft 26.

An impeller outer shroud 34 is secured at its hub 36 to the inner surface of the shell portion 16. By preference the connection between shroud 34 and shell portion 16 is formed by spot welding. The outer margin of the shroud 34 also can be welded to the inner surface of the impeller shell portion 16, a suitable tab 38 being provided for the purpose of facilitating a spot welded connection at this point. The impeller includes also an inner shroud 40 which cooperates with the shroud 34 to define radial outflow passages that contain flow directing blades 42.

A turbine 44 also is situated within the shell 14. It includes an outer shroud 46, an inner shroud 48 and turbine blades 50 disposed between the shrouds 46 and 48. These blades define radial inflow passages which are arranged in juxtaposition with respect to the passages of the impeller.

The outer shroud 46 of the turbine 44 is connected to an outer race 52 for an overrunning coupling shown generally by reference character 54. This race comprises a cage 56 having thrust plates 58 and 60 which straddle the race 52. The race 52 has projecting portions 62 that are received within apertures formed in the cage 56. These projections are secured by welding or by any other suitable fastening means to the shroud 46.

A planetary gear unit is indicated generally by reference character 64. It includes a ring gear 66, a sun gear 68, a carrier 70 and planet pinions 72 mounted upon the carrier 70.

Sun gear 68 is connected to or is formed integrally with the inner race 74 of an overrunning brake 76. Race 74 is splined at 78 to a stationary stator sleeve shaft 80 which is connected to a stationary wall of the transmission housing.

The torque converter includes a bladed stator 82 comprising stator blades 84 situated between a first shroud 86 and a second shroud 88. Shroud 88 is formed with a central opening 90 which receives an outer race 92 for the overrunning brake 76. A splined or keyed connection holds the race 92 fast within the opening 90. Axial displacement of the race 92 with respect to the shroud 88 is prevented by snap rings 94 and 96 and by thrust plates 98 and 100.

Race 92 can be cammed to provide cam surfaces that register with rollers 102 situated between races 74 and 92. The rollers establish one-way braking action for the stator 82 so that the stator can freewheel in the direction of rotation of the impeller, but rotation in the opposite direction is inhibited.

A thrust bearing 104 is situated between the plate 98 and the hub 24 of the shell portion 16.

A converter torus flow passage is defined in part by the annular space between the impeller sleeve shaft 26 and the stationary sleeve shaft 80. This passage is defined also by radial grooves 106 formed in the thrust plate 98.

Thrust plate 100 is adapted to engage a side plate 108 of the carrier 70. A thrust washer 110 is situated between the plate 108 and the thrust plate 100. Another thrust washer 112 is situated between the ring gear member and another side plate 114 of the carrier 70.

Plate 108 is riveted as shown at 116 or is otherwise secured to the hub 118 of a clutch member 120. This member includes an apertured portion 122 that extends between the flow discharge section of the turbine 44 and the flow entrance section of the stator 82. Portion 122 is formed with a plurality of apertures 124 which provide minimum flow resistance to the toroidal fluid flow.

The member 120 extends through the central eyelet region of the converter circuit. It includes also an apertured portion 126 situated between the flow exit section of the impeller and the flow entrance section of the turbine. This portion 126 is formed with apertures 128 which allow free flow of fluid through the outer region of the torus circuit.

The radially outward periphery of the member 120 is keyed or otherwise secured at 130 to an annular clutch member 132. The clutch member 132 includes a drum shaped peripheral portion and a radially extending wall 134 which is situated between the shell portion 20 and the outer shroud 46 of the turbine 44. The central hub portion of the circular wall 134 is splined or keyed to an inner race 136 of an overrunning coupling shown at 138. This coupling includes overrunning clutch elements in the form of sprags or rollers 140 and an outer race 142. If the clutch elements are in the form of rollers, the race 142 can be cammed to provide one-way clutching action between the rollers and the race 142.

Race 142 is externally splined or keyed to the bracket 144 which in turn is secured to the inner surface of the shell portion 20.

The central hub portion of wall 134, which is keyed or splined to race 136 as indicated, is piloted on a pilot sleeve 146. A bearing 148 is provided at this point as indicated.

The ring gear 66 of the planetary gear unit 64 is connected to a mounting sleeve 150 which in turn is splined at 152 to turbine shaft 154. A bushing 156 is situated between the sleeve 146 and the sleeve 150.

Overrunning coupling 54 includes rollers or sprags 158 which establish a one-way clutching action between the outer surface 160 of the ring gear 66 and the outer race 52. Outer race 52 can be cammed to provide camming action between elements 158 and the race 52 if elements 158 are in the form of rollers.

The radially outward part of wall portion 134 carries a clutch friction disc 162. This disc is adapted to engage frictionally an annular surface 164 formed on the shell portion 20.

Turbine shaft 154 is formed with a central opening 166 which serves as a toroidal fluid flow passage. This communicates with a radial passage 168 formed in the sleeve 146. This passage is also defined in part by the annular space between wall 134 and shell part 20.

The wall 134 is adapted to flex slightly thereby allowing disc 162 to engage and disengage the surface 164. The clutching action between disc 162 and surface 164 can be obtained by controlling suitably the pressure differential across the wall 134.

During operation of the torque converter, fluid may be fed to the torus circuit through passage 166. It then flows radially outwardly through the annular space between shell part 20 and wall 134 and past the juxtaposed friction surfaces of the clutch shown in part at 162 and 164. The fluid then passes into the torus circuit where it circulates in a toroidal fluid flow path in known fashion. The fluid then is returned to a low pressure region through the space between shroud 34 and stator shroud 88 and through radial grooves 106 to the annular passage between sleeve shaft 88 and sleeve 26.

If it is desired to engage the clutch shown in part at 162 and 164, it merely is necessary to reverse the direction of flow of fluid through the torus circuit. Thus the passage shown in part at 166 becomes a flow return passage rather than a feed passage. Conversely the annular space between sleeve shaft 80 and sleeve 26 becomes a feed passage rather than a flow return passage. This creates a pressure differential across the wall 134 which causes it to shift in a left-hand direction into a clutch engaging position. A direct driving connection then is established between carrier 70 and the shell 14.

The engagement of the clutch shown in part at 162 and 164 can be controlled also by independently controlling the pressure in the passage shown in part at 166 while the annular space between sleeve shaft 88 and the turbine shaft 154 forms a flow return passage. Continuous circulation of fluid through the torus region thus takes place regardless of whether the clutch is engaged or disengaged. In this latter instance, the annular space between sleeve 26 and sleeve shaft 80 functions as a converter fluid feed passage regardless of whether the clutch is engaged or disengaged.

For the purpose of describing the mode of operation of the structure of FIGURE 1, the clutch shown in part at 162 and 164 will be identified as clutch A. The annular space between shell part 20 and the wall 134 will be identified as space E. The coupling 138 will be described as clutch C. The clutch 54 will be described as clutch B and the planetary gear unit will be identified as gearset D.

When cavity E is pressurized or when it acts as a portion of the converter feed passage, clutch A is disengaged and is allowed to freewheel. The torque converter then functions in the usual fashion to multiply the impeller torque. The turbine delivers its torque through clutch B and then to the turbine shaft 154 through the ring gear member 66. The carrier 70 and the clutch element 130 freewheel and are ineffective.

Delivery of torque in the reverse direction during coasting can be obtained as turbine shaft 154 drives ring gear member 66. The sun gear 72 is held stationary since it is splined directly to the stationary inner race of the overrunning brake 76. This causes the clutch element 132 and the connecting member 120 to rotate in the direction of rotation of the impeller at a speed faster than the speed of rotation of the turbine. Under these conditions the clutch C will be effective to deliver torque from the carrier 70 to the engine crankshaft.

If the cavity E is exhausted, clutch A becomes engaged by the hydraulic charge pressure in the converter. Engine torque is then transmitted through clutch A and through the connecting member 120 to the carrier of the gearset D. Sun gear 68, which is held stationary, acts as a reaction point. The ring gear member 66 is overspeeded thereby producing an overdrive condition. Turbine shaft 154, of course, is driven at the speed of rotation of the ring gear member 66. Since ring gear member 66 rotates faster than the outer race 52 of clutch B, the clutch B overruns. Thus a mechanical torque delivery path with an overdrive ratio is established between the engine crankshaft and the turbine shaft 154. The converter no longer functions to deliver torque since all of the torque is delivered mechanically through the gearing.

When clutch A is engaged, the ratio of the converter output speed to the converter input speed is equal to the sum of the pitch diameters of the ring gear and the sun gear divided by the pitch diameter of the ring gear.

I contemplate that this converter can be used both with a three speed power transmission system and with geared power transmission systems having greater or fewer numbers of speed ratios. In any event the torque ratio coverage is increased. Furthermore, the high speed ratio cruising performance is characterized by a higher degree of efficiency by reason of the overdrive ratio that is available. This advantage is realized without impairing the performance characteristics of the converter and of the geared transmission during acceleration of the vehicle.

FIGURE 2 is a summation of the mode of operation of the structure shown in FIGURE 1. In FIGURE 2 the symbol R indicates the number of teeth in the ring gear and the symbol S indicates the number of teeth in the sun gear.

Having thus described a preferred form of my invention, what I claim and desire to secure by U.S. Letters Patent is:

1. A hydrokinetic power transmission mechanism comprising a bladed impeller and a bladed turbine situated in toroidal fluid flow relationship, a planetary gear unit comprising a ring gear, a carrier, a sun gear and planet pinions rotatably supported on said carrier in meshing engagement with said sun and ring gears, means for anchoring said sun gear to a stationary portion of said mechanism, a turbine driven shaft, means for connecting said ring gear to said turbine driven shaft, means for establishing a one-way driving connection between said turbine and said ring gear, selectively engageable clutch means for establishing and disestablishing a driving connection between said carrier and said impeller, said converter comprising also a bladed stator, one-way brake means for anchoring said stator against rotation in a direction opposite to the direction of rotation of said impeller while accommodating free-wheeling motion of said stator in the opposite direction, said one-way brake means comprising an inner race, and a stationary stator sleeve shaft splined to said inner race, said stator sleeve shaft being connected to said sun gear.

2. A hydrokinetic power transmission mechanism comprising a bladed impeller and a bladed turbine situated in toroidal fluid flow relationship, a planetary gear unit comprising a ring gear, a carrier, a sun gear and planet pinions rotatably supported on said carrier in meshing engagement with said sun and ring gears, means for anchoring said sun gear to a stationary portion of said mechanism, a turbine driven shaft, means for connecting said ring gear to said turbine driven shaft, means for establishing a one-way driving connection between said turbine and said ring gear, selectively engageable clutch means for establishing and disestablishing a driving connection between said carrier and said impeller, said selectively engageable clutch means comprising a first clutch element carried by said impeller and a second clutch element secured to said carrier, and one-way coupling means for establishing a one-way driving connection between said second clutch element and said impeller to accommodate coasting torque delivery between said turbine driven shaft and said impeller, said converter comprising also a bladed stator, one-way brake means for anchoring said stator against rotation in a direction opposite to the direction of rotation of said impeller while accommodating freewheeling motion of said stator in the opposite direction, said one-way brake means comprising an inner race, and a stationary stator sleeve shaft splined to said inner race, said stator sleeve shaft being connected to said sun gear.

3. A hydrokinetic power transmission mechanism comprising a bladed impeller and a bladed turbine situated in toroidal fluid flow relationship, a planetary gear unit comprising a ring gear, a carrier, a sun gear and planet pinions rotatably supported on said carrier in meshing engagement with said sun and ring gears, means for anchoring said sun gear to a stationary portion of said mechanism, a turbine driven shaft, means for connecting said ring gear to said turbine driven shaft, means for establishing a one-way driving connection between said turbine and said ring gear, selectively engageable clutch means for establishing and disestablishing a driving connection between said carrier and said impeller, said converter comprising also a bladed stator, one-way brake means for anchoring said stator against rotation in a direction opposite to the direction of rotation of said impeller while accommodating freewheeling motion of said stator in the opposite direction, said one-way brake means comprising an inner race, and a stationary stator sleeve shaft splined to said inner race, said stator sleeve shaft being connected to said inner race and said sun gear, said impeller comprising an impeller shell defining a closed hydrodynamic cavity, said turbine and said gear unit being situated entirely within said cavity.

4. A hydrokinetic power transmission mechanism comprising a bladed impeller and a bladed turbine situated in toroidal fluid flow relationship, a planetary gear unit comprising a ring gear, a carrier, a sun gear and planet pinions rotatably supported on said carrier in meshing engagement with said sun and ring gears, means for anchoring said sun gear to a stationary portion of said mechanism, a turbine driven shaft, means for connecting said ring gear to said turbine driven shaft, means for establishing a one-way driving connection between said turbine and said ring gear, and selectively engageable clutch means for establishing and disestablishing a driving connection between said carrier and said impeller, said selectively engageable clutch means comprising a first clutch element carried by said impeller and a second clutch element secured to said carrier, and one-way coupling means for establishing a one-way driving connection between said second clutch element and said impeller to accommodate coasting torque delivery between said turbine driven shaft and said impeller, said converter comprising also a bladed stator, one-way brake means for anchoring said stator against rotation in a direction opposite to the direction of rotation of said impeller while accommodating free-wheeling motion of said stator in the opposite direction, said one-way brake means comprising an inner race, and a stationary stator sleeve shaft splined to said inner race, said stator sleeve shaft being connected to said inner race and said sun gear, said impeller comprising an impeller shell defining a closed hydrodynamic cavity, said turbine and said gear unit being situated entirely within said cavity.

5. A hydrokinetic power transmission mechanism comprising a bladed impeller and a bladed turbine situated in toroidal fluid flow relationship, a planetary gear unit comprising a ring gear, a carrier, a sun gear and planet pinions rotatably supported on said carrier in meshing engagement with said sun and ring gears, means for anchoring said sun gear to a stationary portion of said mechanism, a turbine driven shaft, means for connecting said ring gear to said turbine driven shaft, means for establishing a one-way driving connection between said turbine and said ring gear, and selectively engageable clutch means for establishing and disestablishing a driving connection between said carrier and said impeller, said impeller comprising an impeller shell defining a closed hydrodynamic cavity, said turbine and said gear unit being situated entirely within said cavity, said clutch means including an annular element carried at the radially outward extremity of said cavity, and a connecting member extending through the torus region of said circuit to said carrier, said annular element being engageable selectively with an adjacent interior surface of said shell.

6. A hydrokinetic power transmission mechanism comprising a bladed impeller and a bladed turbine situated in toroidal fluid flow relationship, a planetary gear unit comprising a ring gear, a carrier, a sun gear and planet pinions rotatably supported on said carrier in meshing engagement with said sun and ring gears, means for anchoring said sun gear to a stationary portion of said mechanism, a turbine driven shaft, means for connecting said ring gear to said turbine driven shaft, means for establishing a one-way driving connection between said turbine and said ring gear, selectively engageable clutch means for establishing and disestablishing a driving connection between said carrier and said impeller, said selectively engageable clutch means comprising a first clutch element carried by said impeller and a second clutch element seured to said carrier, and one-way coupling means for establishing a one-way driving connection between said second clutch element and said impeller to accommodate coasting torque delivery between said turbine driven shaft and said impeller, said impeller comprising an impeller shell defining a closed hydrodynamic cavity, said turbine and said gear unit being situated entirely within said cavity, said clutch means including an annular element carried at the radially outward extremity of said cavity, and a connecting member extending through the torus region of said circuit to said carrier, said annular element being engageable selectively with an adjacent interior surface of said shell.

7. A hydrokinetic power transmission mechanism comprising a bladed impeller and a bladed turbine situated in toroidal fluid flow relationship, a planetary gear unit comprising a ring gear, a carrier, a sun gear and planet pinions rotatably supported on said carrier in meshing engagement with said sun and ring gears, means for anchoring said sun gear to a stationary portion of said mechanism, a turbine driven shaft, means for connecting said ring gear to said turbine driven shaft, means for establishing a one-way driving connection between said turbine and said ring gear, selectively engageable clutch means for establishing and disestablishing a driving connection between said carrier and said impeller, said converter comprising also a bladed stator, one-way brake means for anchoring said stator against rotation in a direction opposite to the direction of rotation of said impeller while accommodating freewheeling motion of said stator in the opposite direction, said one-way brake means comprising an inner race, and a stationary stator sleeve shaft splined to said inner race, said stator sleeve shaft being connected to said inner race and said sun gear, said impeller comprising an impeller shell defining a closed hydrodynamic cavity, said turbine and said gear unit being situated entirely within said cavity, said clutch means including an annular element carried at the radially outward extremity of said cavity, and a connecting member extending through the torus region of said circuit to said carrier, said annular element being engageable selectively with an adjacent interior surface of said shell.

8. A hydrokinetic power transmission mechanism comprising a bladed impeller and a bladed turbine situated in toroidal fluid flow relationship, a planetary gear unit comprising a ring gear, a carrier, a sun gear and planet pinions rotatably supported on said carrier in meshing engagement with said sun and ring gears, means for anchoring said sun gear to a stationary portion of said mechanism, a turbine driven shaft, means for connecting said ring gear to said turbine driven shaft, means for establishing a one-way driving connection between said turbine and said ring gear, and selectively engageable clutch means for establishing and disestablishing a driving connection between said carrier and said impeller, said selectively engageable clutch means comprising a first clutch element carried by said impeller and a second clutch element secured to said carrier, and one-way coupling means for establishing a one-way driving connection between said second clutch element and said impeller to accommodate coasting torque delivery between said turbine driven shaft and said impeller, said converter comprising also a bladed stator, one-way brake means for anchoring said stator against rotation in a direction opposite to the direction of rotation of said impeller while accommodating freewheeling motion of said stator in the opposite direction, said one-way brake means comprising an inner race, a stationary stator sleeve shaft splined to said inner race, said stator sleeve shaft being connected to said inner race and said sun gear, said impeller comprising an impeller shell defining a closed hydrodynamic cavity, said turbine and said gear unit being situated entirely within said cavity, said clutch means including an annular element carried at the radially outward extremity of said cavity, and a connecting member extending through the torus region of said circuit to said carrier, said annular element being engageable selectively with an adjacent interior surface of said shell.

References Cited
UNITED STATES PATENTS

| | | | |
|---|---|---|---|
| 2,390,645 | 12/1945 | Frank | 74—688 |
| 2,995,956 | 8/1961 | Moore | 74—688 |
| 3,000,233 | 9/1961 | Roche | 74—688 |
| 3,048,057 | 8/1962 | Dodge | 74—688 |
| 3,217,563 | 11/1965 | Simpson | 74—688 |
| 3,282,129 | 11/1966 | Gabriel | 74—688 |

DONLEY J. STOCKING, *Primary Examiner.*

THOMAS C. PERRY, *Examiner.*

UNITED STATES PATENT OFFICE
CERTIFICATE OF CORRECTION

Patent No. 3,354,746　　　　　　　　　　　　November 28, 1967

Andrew Paredes

It is certified that error appears in the above identified patent and that said Letters Patent are hereby corrected as shown below:

Column 5, lines 24, 52, and 72, and column 6, line 28, "converter", each occurrence, should read -- mechanism --.

Signed and sealed this 17th day of March 1970.

(SEAL)
Attest:

Edward M. Fletcher, Jr.　　　　　　　　　　WILLIAM E. SCHUYLER, JR.
Attesting Officer　　　　　　　　　　　　　　Commissioner of Patents